(12) United States Patent
Haraguchi et al.

(10) Patent No.: US 6,373,225 B1
(45) Date of Patent: Apr. 16, 2002

(54) CHARGE CIRCUIT THAT PERFORMS CHARGE CONTROL BY COMPARING A PLURALITY OF BATTERY VOLTAGES

(75) Inventors: Akira Haraguchi; Takashi Matsumoto, both of Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/815,049

(22) Filed: Mar. 23, 2001

(30) Foreign Application Priority Data

Aug. 31, 2000 (JP) ........................... 2000-263569

(51) Int. Cl.⁷ ..................... H01M 10/44; H01M 10/46
(52) U.S. Cl. ........................... 320/122; 320/134
(58) Field of Search ..................... 320/116, 119, 320/120, 122, 134

(56) References Cited

U.S. PATENT DOCUMENTS 5,825,155 A * 10/1998 Ito et al.
5,929,593 A * 7/1999 Eguchi
6,064,179 A * 5/2000 Ito et al.
6,087,807 A * 7/2000 Sudo et al.

FOREIGN PATENT DOCUMENTS

| JP | 7-87673 | 3/1995 |
| JP | 9-28042 | 1/1997 |

* cited by examiner

Primary Examiner—Edward H. Tso
(74) Attorney, Agent, or Firm—Staas & Halsey LLP

(57) ABSTRACT

A charge and discharge circuit that reduces the power consumption at charging and discharging without shortening the life of secondary batteries is described. The charge and discharge circuit includes charge current control circuits connected in parallel to the secondary batteries for performing bypass control of a charge current supplied to the secondary batteries. A potential difference detection circuit detects a voltage difference between the secondary batteries and controls the charge current control circuits in accordance with the voltage difference to selectively bypass the charge current supplied to the secondary batteries.

15 Claims, 3 Drawing Sheets

CHARGE CIRCUIT THAT PERFORMS CHARGE CONTROL BY COMPARING A PLURALITY OF BATTERY VOLTAGES

BACKGROUND OF THE INVENTION

The present invention relates to a charge circuit, and, more particularly, to a charge circuit, a charge and discharge circuit and a battery pack that are suitable for a secondary battery used in portable electronic apparatus, such as notebook-size personal computers.

FIG. 1 is a schematic circuit diagram of a prior art charge and discharge circuit 100, which is conventionally built in a battery pack that is installed in a notebook-size personal computer. The function of the prior art circuit is described in the following to illustrate the limitations of conventional charge circuits. The charge and discharge circuit 100 controls charging and discharging of a battery 1 built in the battery pack. The battery 1 includes a plurality of (for example, three) lithium ion batteries 1a–1c connected in series. The charge and discharge circuit 100 includes a balanced current setting circuit 4 and a charging and discharging control circuit 7.

The positive electrode of the battery 1 is connected to a positive input/output terminal t1 via a discharge control switch 2 including a P-channel MOS (PMOS) transistor and a charge control switch 3 including the PMOS transistor. The negative electrode of the battery 1 is connected to a negative input/output terminal t2. When charges are charged into the battery 1, a direct current voltage is applied from a personal computer to the positive and negative input/output terminals t1, t2. When the charges of the battery 1 are discharged, driving power is supplied from the positive and negative input/output terminals t1, t2 to the personal computer.

When charges are charged into the battery 1, even if the discharge control switch 2 is turned off, a charge current is supplied from the personal computer to the battery 1 via the charge control switch 3 that is turned on and a parasitic diode D2 of the discharge control switch 2. When the charges of the battery 1 are discharged, even if the charge control switch 3 is turned off, a discharge current is supplied from the battery 1 to the personal computer via the discharge control switch 2 that is turned on and a parasitic diode D3 of the charge control switch 3.

The balanced current setting circuit 4 includes three charge current control circuits 4a–4c connected in parallel to the lithium ion batteries 1a–1c, respectively. The charge current control circuits 4a–4c include resistors 5a–5c and N-channel MOS (NMOS) transistors 6a–6c, respectively. When each of the NMOS transistors 6a–6c is turned on, charges of the corresponding lithium ion batteries 1a–1c are discharged.

The charging and discharging control circuit 7 includes a cell voltage detection circuit 8, an overcharge detection circuit 9 and an over discharge detection circuit 10. The cell voltage detection circuit 8 includes three cell voltage amplifiers 8a–8c that detect inter-terminal voltages (cell voltages) Va–Vc of the lithium ion batteries 1a–1c, respectively. Each of the cell voltage amplifiers is preferably an operational amplifier (op amp) having an amplification factor "1".

Specifically, a non-inverting input terminal of the first cell voltage amplifier 8a is connected to the positive electrode of the first lithium ion battery 1a and the inverting input terminal thereof is connected to the negative electrode of the first lithium ion battery 1a (positive electrode of the second lithium ion battery 1b). The first cell voltage amplifier 8a detects the inter-terminal voltage (cell voltage) Va of the first lithium ion battery 1a and supplies the cell voltage Va to the overcharge detection circuit 9.

A non-inverting input terminal of the second cell voltage amplifier 8b is connected to the positive electrode of the second lithium ion battery 1b and the inverting input terminal thereof is connected to the negative electrode of the second lithium ion battery 1b (positive electrode of the third lithium ion battery 1c). The second cell voltage amplifier 8b detects the inter-terminal voltage (cell voltage) Vb of the second lithium ion battery 1b and supplies the cell voltage Vb to the overcharge detection circuit 9.

A non-inverting input terminal of the third cell voltage amplifier 8c is connected to the positive electrode of the third lithium ion battery 1c and the inverting input terminal thereof is connected to the negative electrode of the third lithium ion battery 1c. The third cell voltage amplifier 8c detects the inter-terminal voltage (cell voltage) Vc of the third lithium ion battery 1c and supplies the cell voltage Vc to the overcharge detection circuit 9.

The overcharge detection circuit 9 includes three comparators 9a–9c and an OR circuit 9d. The first cell voltage Va is supplied to a non-inverting input terminal of the first comparator 9a and a second reference voltage VTH is supplied to the non-inverting input terminal thereof. The first comparator 9a supplies a low-level detection signal to the OR circuit 9d when the first cell voltage Va is below the second reference voltage VTH. When the first cell voltage Va is equal to or greater than the second reference voltage VTH, a high-level detection signal is supplied to the OR circuit 9d. That is, the first comparator 9a supplies the high-level detection signal to the OR circuit 9d when the inter-terminal voltage Va of the first lithium ion battery 1a reaches the second reference voltage VTH.

The first comparator 9a has hysteresis and maintains the output of a high-level detection signal until the first cell voltage Va drops to a predetermined voltage VTL smaller than the second reference voltage VTH after the first cell voltage Va reaches a voltage equal to or greater than the second reference voltage VTH at one time.

The second cell voltage Vb is supplied to a non-inverting input terminal of the second comparator 9b and the second reference voltage VTH is supplied to the non-inverting input terminal thereof. The second comparator 9b supplies a low-level detection signal to the OR circuit 9d when the second cell voltage Vb is below the second reference voltage VTH. When the second cell voltage Vb is equal to or greater than the second reference voltage VTH, a high-level detection signal is supplied to the OR circuit 9d. That is, the second comparator 9b supplies the high-level detection signal when the inter-terminal voltage Vb of the second lithium ion battery 1b reaches the second reference voltage VTH.

The second comparator 9b has hysteresis and maintains the output of a high-level detection signal until the second cell voltage Vb drops to the predetermined voltage VTL smaller than the second reference voltage VTH after the second cell voltage Vb reaches a voltage equal to or greater than the second reference voltage VTH at one time.

The third cell voltage Vc is supplied to a non-inverting input terminal of the third comparator 9c and the second reference voltage VTH is supplied to the non-inverting input terminal thereof. The third comparator 9c supplies a low-level detection signal to the OR circuit 9d when the third cell voltage Vc is below the second reference voltage VTH. When the third cell voltage Vc is equal to or greater than the second reference voltage VTH, a high level detection signal is supplied to the OR circuit 9d. That is, the third comparator 9c supplies the high-level detection signal to the OR circuit 9d when the inter-terminal voltage Vc of the third lithium ion battery 1c reaches the second reference voltage VTH.

The third comparator 9a has hysteresis and maintains the output of a high-level detection signal until the third cell voltage Vc drops to the predetermined voltage VTL smaller than the second reference voltage VTH after the third cell voltage Vc reaches a voltage equal to or greater than the second reference voltage VTH at one time.

The output terminal of the OR circuit 9d is connected to the gate terminal of the charge control switch 3 (PMOS transistor). The OR circuit 9d turns off the charge control switch 3 when at least one of the detection signals of the comparators 9a–9c is at the high level. That is, when at least one inter-terminal voltage of the lithium ion batteries 1a–1c reaches the second reference voltage VTH, the charge control switch 3 is turned-off and charging is stopped.

The detection signals of the comparators 9a–9c are also supplied to gate terminals of NMOS transistors 6a–6c, respectively. For example, when the detection signal of the comparator 9a is at the high level, the NMOS transistor 6a is turned on and the charges of the first lithium ion battery 1a is discharged via the NMOS transistor 6a. Thus the inter-terminal voltage Va of the first lithium ion battery 1a drops to the predetermined voltage VTL. When the inter-terminal voltages Va–Vc of the lithium ion batteries 1a–1c drop to the voltage VTL, charging is restarted.

When the overcharge detection circuit 10 receives the inter-terminal voltages Va–Vc of each of the lithium batteries 1a–1c from the cell voltage amplifiers 8a–8c and at least one of the inter-terminal voltages Va–Vc drops below a predetermined third reference voltage, the charge control switch 2 is turned off and the discharging of the battery 1 is stopped. That is, when at least one of the inter-terminal voltages Va–Vc of the lithium ion batteries 1a–1c drops to a voltage equal to or smaller than the predetermined third reference voltage, the supply of driving power from the battery 1 to the personal computer is stopped.

Since there is dispersion in the lithium ion batteries 1a–1c, a difference arises in the inter-terminal voltages Va–Vc when charging starts or a difference arises at the time when the inter-terminal voltage reaches the second reference voltage VTH. In this case, the inter-terminal voltages Va–Vc of the lithium ion batteries 1a–1c will not reach the second reference voltage VTH at the same time. As a result, for example, when the first lithium ion battery 1a reaches the second reference voltage VTH, charging is temporarily stopped. After the inter-terminal voltage Va is dropped to the voltage VTL by discharging the charging charges of the first lithium ion battery 1a, the charging is restarted. The lithium ion batteries 1a–1c are evenly charged by repeating charging and discharging in this manner.

In the charging method of the aforementioned lithium ion batteries 1a–1c, however, a stress applies to each lithium ion battery and its life is shortened. Otherwise, since there is dispersion in the lithium ion battery, the charging and discharging are collectively repeated against a specific lithium ion battery and that lithium ion battery deteriorates faster than another lithium ion battery.

Japanese Patent Laid-Open Publication No. 7-87673A discloses a charging control system that charges a battery without repeating charging and discharging. The charging control system comprises a plurality of detectors that detect the inter-terminal voltages of a plurality of lithium ion batteries and a plurality of bypass circuits connected in parallel to the plurality of lithium ion batteries, respectively. When the inter-terminal voltages of the lithium ion batteries detected by the detectors reach a predetermined voltage, the associated bypass circuit is conducted and charging is terminated.

In the aforementioned charging control system, however, regardless of the dispersion of the inter-terminal voltage of each lithium ion battery, the bypass circuit associated with the battery that reached the predetermined voltage is conducted. Therefore, if the dispersion of the inter-terminal voltage is large, the bypass circuit conducted first is kept in the conduction state for a long time. As a result, the durability of the bypass circuit decreases and the power consumption increases.

Japanese Patent Laid Open Publication No. 7-87673A discloses a charging control system that performs charging in the state where the inter-terminal voltages of two lithium ion batteries are always equal. The charging control system includes a resistance voltage dividing circuit that generates half the voltage of the total voltages of two batteries and an amplifier that amplifies the half voltage at an amplification factor "1". The output of the amplifier is connected to the node of the two lithium ion batteries. When the inter-terminal voltage of the lithium ion battery on the positive electrode side is greater than the inter-terminal voltage of the lithium ion battery on the negative electrode side, the lithium ion battery on the negative electrode side is charged by the amplifier. When the inter-terminal voltage of the lithium ion battery on the positive electrode side is smaller than the inter-terminal voltage of the lithium ion battery On the negative electrode side, the lithium ion battery on the positive side is charged.

In the aforementioned control system, however, even when the two lithium ion batteries are discharged, the amplifier and the voltage dividing circuit are activated by the power supply voltages of the batteries, so that the power consumption increases. As a result, the service time of a battery pack is shortened. Moreover, applying the aforementioned control system to three lithium ion batteries or more makes the circuit configuration very complicate.

SUMMARY OF THE INVENTION

An object of the present invention is to provide a charge and discharge circuit that reduces the power consumption at charging and discharging without shortening the life of a secondary battery.

In a first aspect of the present invention, a charge circuit that charges a plurality of secondary batteries is described. The charge circuit includes a plurality of charge current control circuits connected in parallel to the plurality of secondary batteries for performing bypass control of a charge current supplied to the plurality of secondary batteries. A potential difference detection circuit is connected to the plurality of charge current control circuits to detect a voltage difference between the plurality of secondary batteries and control the plurality of charge current control circuits in accordance with the voltage difference to selectively bypass the charge current supplied to the plurality of secondary batteries.

In a second aspect of the present invention, a charge circuit that charges a plurality of secondary batteries is provided. The charge circuit includes a plurality of charge current control circuits, connected in parallel to the plurality of secondary batteries, respectively, for performing bypass control of a charge current supplied to the plurality of secondary batteries. A plurality of potential difference detection circuits are connected to the plurality of charge current control circuits, respectively. Each potential difference detection circuit detects a voltage difference between a voltage of the associated secondary battery and a voltage of another secondary battery and controls the associated charge current control circuit in accordance with the voltage difference to selectively bypass the charge current supplied to the associated secondary battery. A charge detection circuit is connected to the plurality of potential difference detection circuits to detect whether charging is performed into the plurality of secondary batteries and activate the plurality of potential difference detection circuits when the charging is performed.

In a third aspect of the present invention, a charge and discharge circuit that performs the charging and discharging of a plurality of secondary batteries is provided. The charge and discharge circuit includes a plurality of charge current control circuits, connected in parallel to the plurality of secondary batteries, for performing bypass control of a charge current supplied to the plurality of secondary batteries. A potential difference detection circuit is connected to the plurality of charge current control circuits to detect a voltage difference of the plurality of secondary batteries and control the plurality of charge current control circuits in accordance with the voltage difference to selectively bypass the charge current supplied to the plurality of secondary batteries. A charge detection circuit is connected to the potential detection circuit to detect whether charging is performed into the plurality of secondary batteries and activate the potential difference detection circuit when the charging is performed. An overcharge detection circuit detects the voltages of the plurality of secondary batteries and stops the charging into the plurality of secondary batteries when and at least one of the detected voltages is equal to or greater than a predetermined first reference voltage. An over discharge detection circuit detects the voltages of the plurality of secondary batteries and stops discharging of the plurality batteries when at least one of the detected voltages drops to a voltage equal to or smaller than a predetermined second reference voltage.

In a fourth aspect of the present invention, a charge and discharge circuit that performs the charging and discharging of a plurality of secondary batteries is provided. The charge and discharge circuit includes a plurality of charge current control circuits, connected in parallel to the plurality of secondary batteries, respectively, for performing bypass control of a charge current supplied to the plurality of secondary batteries. A plurality of potential detection circuits are connected to the plurality of charge current control circuits, respectively. Each potential detection circuit detects a voltage difference between the voltage of associated secondary battery and the voltage of another secondary battery and controls the associated charge current control circuit in accordance with the voltage difference to selectively bypass the charge current supplied to the associated secondary battery. A charge detection circuit is connected to the plurality of potential difference detection circuit to detect whether charging is performed into the plurality of secondary batteries and activate the plurality of potential difference detection circuits. An overcharge detection circuit detects the voltages of the plurality of secondary batteries and stops the discharging of the plurality of secondary batteries when at least one of the detected voltages is equal to or greater than a predetermined first reference voltage. An over discharge detection circuit detects the voltages of the plurality of secondary batteries and stops the discharging of the plurality of secondary batteries when and at least one of the detected voltages drops to a voltage equal to or smaller than a predetermined second reference voltage.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
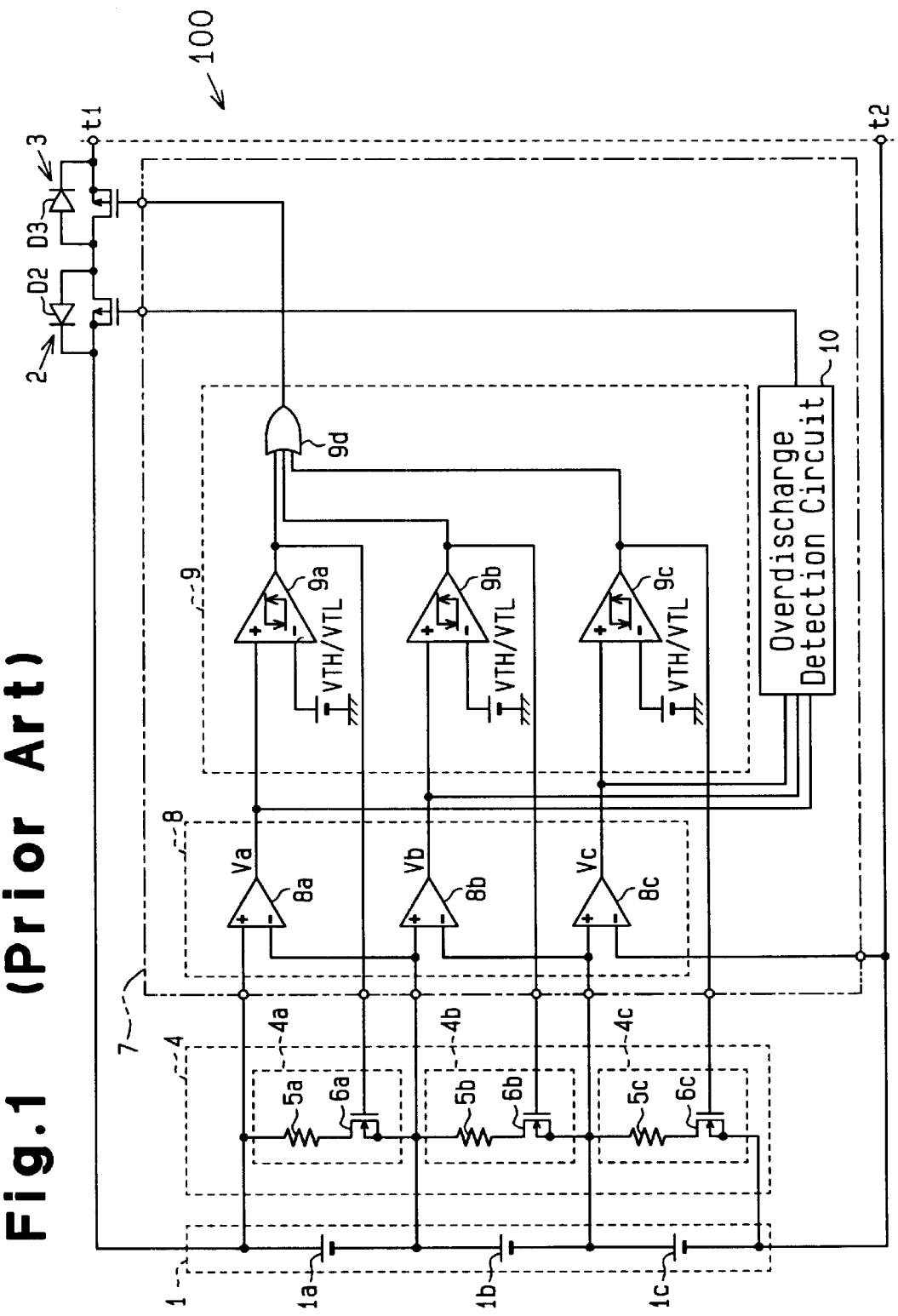
FIG. 1 is a schematic circuit diagram of a prior art charge and discharge circuit.

In the drawings, like numerals are used for like elements throughout.

Figure 2:
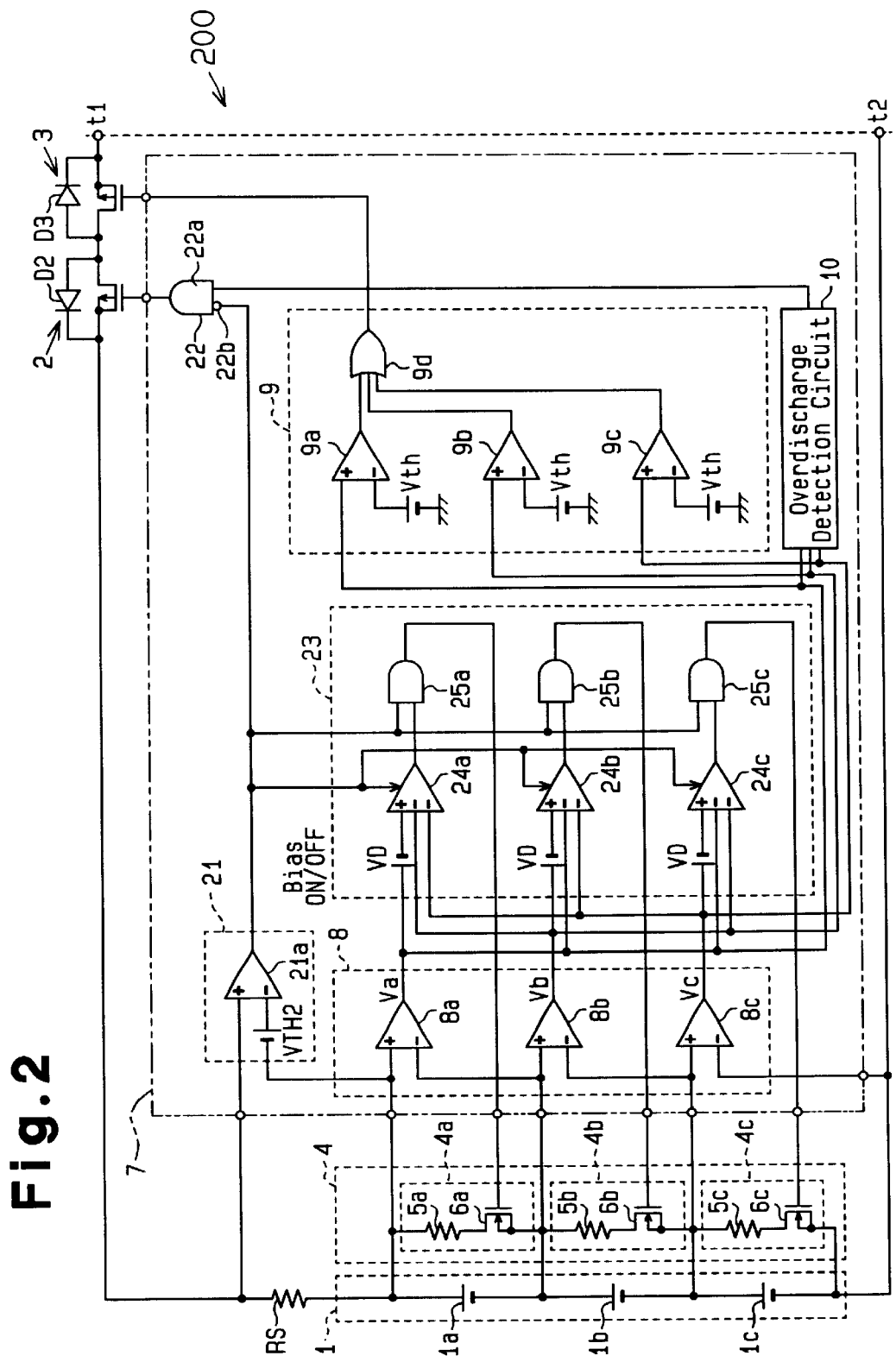
FIG. 2 is a schematic circuit diagram of a charge and discharge circuit according to a first embodiment of the present invention.

As shown in FIG. 2, a charge and discharge circuit 200 according to a first embodiment of the present invention includes a balanced current setting circuit 4, a charging and discharging control circuit 7, and a charge detect resistor RS connected between the positive electrode of a battery 1 and the discharge control switch 2. The charging and discharging control circuit 7 includes a cell voltage detection circuit 8, an overcharge detection circuit 9, an over discharge detection circuit 10, a charge detection circuit 21, a gate circuit 22, and a balanced current control circuit 23 (a potential difference detection circuit). The charge and discharge circuit 200 is preferably built in a battery pack.

Each of the three comparators 9a–9c of the overcharge detection circuit 9 has no hysteresis, generates a high-level detection signal when a cell voltage is equal to or greater than the second reference voltage VTH, and generates a low-level detection signal when the cell voltage dropped below the second reference voltage VTH.

The charge detection circuit 21 includes a comparator 21a that has a non-inverting input terminal connected to a node between the charge detection resistor RS and the discharge control switch 2 and an inverting input terminal connected to a node between the charge detection resistor RS and the battery 1 via a second reference offset voltage VTH2. The second reference offset voltage VTH2 is smaller than the inter-terminal voltage of the charging detection resistance RS based on the current that flows in the charge detection resistor RS at charging. At charging, the input voltage of the non-inverting input terminal of the comparator 21a is greater than the input voltage of the inverting input terminal and the comparator 21a generates a high-level output signal. At discharging, the input voltage of the non-inverting input terminal is smaller than the input voltage of the inverting input terminal and the comparator 21a generates a low level output signal. That is, the charge detection circuit 21 generates the high-level output signal at charging, and the low-level output signal at discharging.

The gate circuit 22 includes an AND circuit 22a and an inverter circuit 22b. The AND circuit 22a has a first input terminal that receives an output signal from the charge detection circuit 21 via the inverter circuit 22b and a second input terminal that receives an output signal from the overcharge detection circuit 10. The output terminal of the AND circuit 22a is connected to the discharge control switch 2 (the gate terminal of the PMOS transistor).

In response to a low-level output signal from the over discharge detection circuit 10 and a high-level output signal from the charge detection circuit 21, the AND circuit 22a supplies a low-level output signal to the discharge control switch 2 and the discharge control switch 2 is turned on. At discharging, when at least one of inter-terminal voltages Va–Vc of lithium ion batteries 1a–1c drops below a predetermined reference voltage and a low-level output signal is output from the charge detection circuit 21, the discharge control switch 2 is turned off.

The balanced current control circuit 23 includes three potential difference comparison comparators 24a–24c and three AND circuits 25a–25c.

Each of the potential difference comparison comparators 24a–24c includes a non-inverting input terminal and two inverting input terminals. Each of the comparators 24a–24c compares the input voltage supplied to the non-inverting input terminal and the smaller input voltage of the input voltages supplied to the two inverting input terminals. Each of the comparators 24a–24c generates a high-level output signal when the input voltage of the non-inverting input terminal is equal to or greater than the smaller input voltage of either of the inverting input terminals. Each of the comparators 24a–24c generates a low-level output signal when the input voltage of the non-inverting input terminal drops below the smaller input voltage of either of inverting input terminals. Therefore, each of the comparators 24a–24c functions as a potential difference circuit.

The potential difference comparison comparators 24a–24c are activated with a high-level output signal output from the charge detection circuit 21. Each of the comparators 24a–24c is a differential amplification type comparator and includes a transistor (a constant current source) that is turned on and off by the output signal of the discharge detection circuit 21. When the output signal of the charge detection circuit 21 is at the high level, the transistor is tuned on and each of the comparators 24a–24c is activated. When the output signal of the charge detection circuit 21 is at the low level, the transistor is turned off and each of the comparators 24a–24c is deactivated. Therefore, at discharging, each of the comparators 24a–24c is deactivated and power is not consumed.

The non-inverting input terminal of the first potential difference comparison comparator 24a is connected to the output terminal of a first cell voltage amplifier 8a of the cell voltage detection circuit 8 via a first reference offset voltage VD (a predetermined first reference voltage). The two inverting input terminals of the first potential difference comparison comparator 24a are connected to the output terminal of a second cell voltage amplifier 8b and the output terminal of a third cell voltage amplifier 8c, respectively.

The first potential difference comparison comparator 24a supplies a high-level output signal to a first AND circuit 25a when the output voltage of the first cell voltage amplifier 8a (inter-terminal voltage Va of the first lithium ion battery 1a) is equal to or greater than the inter-terminal voltage Vb of the lithium ion battery 1b or the inter-terminal voltage Vc of the lithium ion battery 1c by the first reference offset voltage VD.

The non-inverting input terminal of the second potential difference comparison comparator 24b is connected to the output terminal of the second cell voltage amplifier 8b via the first reference offset voltage VD. The two inverting input terminals of the second potential difference comparison comparator 24b are connected to the output terminal of the first cell voltage amplifier 8a and the output terminal of the third cell voltage amplifier 8c, respectively.

The second potential difference comparison comparator 24b supplies a high-level output signal to a second AND circuit 25b when the output voltage of the second cell voltage amplifier 8b (inter-terminal voltage Vb of the second lithium ion battery 1b) is equal to or greater than the inter-terminal voltage Va of the lithium ion battery 1a or the inter-terminal voltage Vc of the lithium ion battery 1c by the first reference offset voltage VD.

The non-inverting input terminal of the third potential difference comparison comparator 24c is connected to the output terminal of the third cell voltage amplifier 8c via the first reference offset voltage VD. The two inverting input terminals of the third potential difference comparison comparator 24c are connected to the output terminal of the first cell voltage amplifier 8a and the output terminal of the second cell voltage amplifier 8b, respectively.

The third potential difference comparison comparator 24c supplies a high-level output signal to a third AND circuit 25c when the output voltage of the third cell voltage amplifier 8c (inter-terminal voltage Vc of the third lithium ion battery 1c) is equal to or greater than the inter-voltage Va of the lithium ion battery 1a or the inter-terminal voltage Vb of the lithium ion battery 1b by the first reference offset voltage VD.

The AND circuits 25a–25c receive output signals from the potential difference comparison comparators 24a–24c, respectively and receive an output signal from the charge detection circuit 21. When the output signal of the charge detection circuit 21 is at the high level, the AND circuits 25a–25c supply the output signals of the potential difference comparison comparators 24a–24c to the gate terminals of NMOS transistors 6a–6c of charge current control circuits 4a–4c, respectively.

Specifically, the output terminal of the first AND circuit 25a is connected to the gate terminal of the NMOS transistor 6a of the first charge current control circuit 4a. When the output voltage of the cell voltage amplifier 8a is equal to or greater than the inter-terminal voltage Vb of the lithium ion battery 1b or the inter-terminal voltage Vc of the lithium ion battery 1c by the first reference offset voltage VD, the NMOS transistor 6a is turned on.

The output terminal of the second AND circuit 25b is connected to the gate terminal of the NMOS transistor 6b of the second charge current control circuit 4b. When the output voltage of the second cell voltage amplifier 8b is equal to or greater than the inter-terminal voltage Va of the lithium ion 1a or the inter-terminal voltage Vc of the lithium ion battery 1c by the first reference offset voltage VD, the NMOS transistor 6b is turned on.

The output terminal of the third AND circuit 25c is connected to the gate terminal of the NMOS transistor 6c of the third charge current control circuit 4c. When the output voltage of the third cell voltage amplifier 8c is equal to or greater than the inter-terminal voltage Va of the lithium ion battery 1a or the inter-terminal voltage Vb of the lithium ion battery 1b by the first reference offset voltage VD, the NMOS transistor 6c is turned on.

Next, the operation of the charge and discharge circuit 200 is described.

Hereupon, the second reference voltage VTH supplied to the comparators 9a–9c may be 4.2 volts and the first reference offset voltage VD may be 0.2 volts.

When a charger is connected to input/output terminals t1, t2 and charging to the battery 1 is started, the charge detection circuit 21 outputs a high-level output signal and the balanced current control circuit 23 is activated.

When each of the inter-terminal voltages Va–Vc of the lithium ion batteries 1a–1c is 3.8 volts, for example, the potential of 0.2 volts (first reference offset voltage VD) does not exist in the inter-terminal voltages Va–Vc of the lithium ion batteries 1a–1c. Therefore, the potential difference comparison comparators 24a–24c supply low-level output signals to the AND circuits 25a–25c and the charge current control circuits 4a–4c are nonconducted. Thus, charging is evenly performed to the lithium ion batteries 1a–1c toward 4.2 volts.

In the following a case is described where the potential difference equal to or greater than 0.2 volt (first reference offset voltage VD) exists in the inter-terminal voltages Va–Vc of the lithium ion batteries 1a–1c is described. For example, when the inter-terminal voltage Va of the first lithium ion battery 1a is 3.8 volts and the inter-terminal voltages Vb, Vc of the second and third lithium ion batteries 1b, 1c are 3.5 volts, the first potential difference comparison comparator 24a supplies a high-level output signal to the first AND circuit 25a and the second and third potential difference comparison comparators 24b, 24c supply low-level output signals to the second and third AND circuits 25b, 25C, respectively. Thereupon, only the first charge current control circuit 4a is conducted and charging is evenly performed to the second and third lithium ion batteries 1b, 1c toward 3.8 volts. At this time, since the charging is continuously performed, even if the first charge current control circuit 4a is conducted, the first lithium ion battery 1a will not discharge charges via the first charge current control circuit 4a.

When the potential difference between the inter-terminal voltages Vb, Vc of the second and third lithium ion batteries 1b, 1c and the inter-terminal voltage Va of the first lithium ion battery 1a is reduced to less than 0.2 volt, the first potential difference comparison comparator 24a supplies a low-level output signal to the first AND circuit 25a. As a result, all of the charge current control circuits 4a–4c are nonconducted and charging is evenly performed to the lithium ion batteries 1a–1c toward 4.2 volts.

Shortly, when charging is evenly performed with the potential difference of less than 0.2 volt and at least one of the lithium ion batteries 1a–1c reaches substantially 4.2 volts, the charge control switch 3 is turned off and the charging is terminated. At this time, the charge detection circuit 21 outputs a low-level output signal and the balanced current control circuit 23 is deactivated.

The charge and discharge circuit 200 of the first embodiment has the following advantages:

(1) Until the lithium ion batteries 1a–1c are evenly charged into 4.2 volts, the battery that was first charged into 4.2 volts will not repeat charging and discharging. Therefore, the deterioration of a lithium ion battery is suppressed and long-life batteries and battery packs are provided.

(2) Until the lithium ion batteries 1a–1c are evenly charged into 4.2 volts, charging operation is continued. Therefore, compared with a conventional method in which charging and discharging are repeated, the charging time is reduced so long as the charging operation will not stop at charging.

(3) The charge current control circuit that corresponds to the lithium ion battery charged first into 4.2 volts is maintained in a nonconducted state until another lithium ion battery is charged into 4.2 volts. Therefore, since no current will flow into the charge current control circuit for a long time, the durability of the charge current control circuit does not deteriorate and the increase of power consumption is prevented.

(4) The charge detection circuit 21 deactivates the balanced current control circuit 23 at discharging. Therefore, the increase of the power consumption of a lithium ion battery at discharging is prevented. Moreover, the NMOS transistors 6a–6c of the charge current control circuits 4a–4c are also turned off at discharging. Therefore, the charges of the respective lithium ion batteries 1a–1c will not be discharged via each of the charge current control circuits 4a–4c. In other words, at discharging, power is not consumed by the charge current control circuits 4a–4c.

(5) When the battery 1 is charged, the charge detection circuit 21 and the gate circuit 22 that turn on the discharge control switch 2 are provided regardless of the detection result (low-level output signal) of the over discharge detection circuit 10 indicating at least one voltage of the lithium ion batteries 1a–1c is overdischarging. Therefore, when at least one voltage of the lithium ion batteries 1a–1c is a discharge voltage, no charge current flows via the parasitic diode D2 of the discharge control switch 2 (PMOS transistor). As a result, the discharge control switch 2 (PMOS transistor) will not be heated due to the charge current that flows into the parasitic diode D2.

Figure 3:
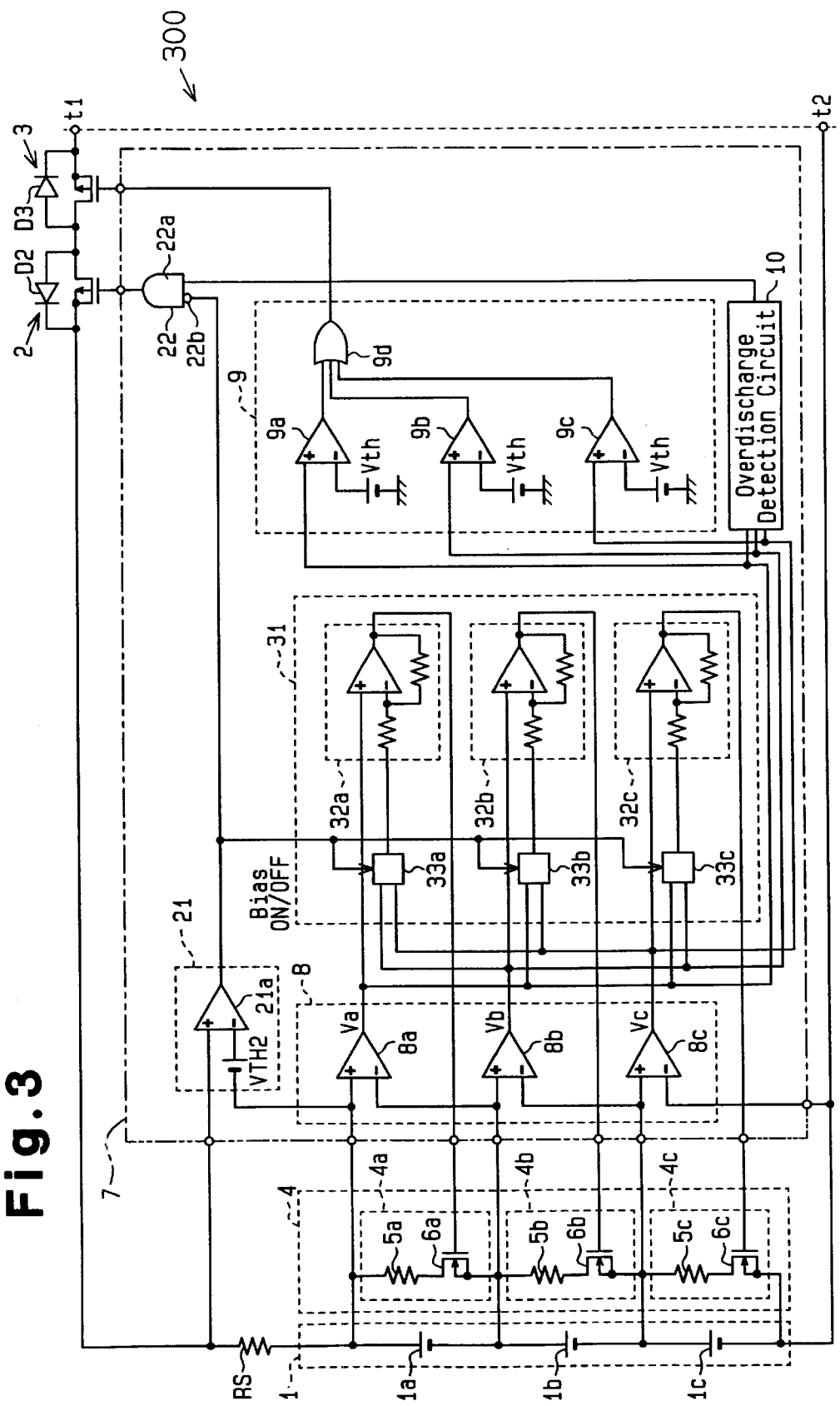
FIG. 3 is a schematic circuit diagram of a charge and discharge circuit according to a second embodiment of the present invention.

As shown in FIG. 3, a charge and discharge circuit 300 according to a second embodiment of the present invention includes a balanced current control circuit 31 that differs from that of the first embodiment. The balanced current control circuit 31 includes three differential voltage amplifiers 32a–32c and three priority circuits 33a–33c. Each of the differential voltage amplifiers 32a–32c amplifies a voltage (differential voltage) obtained by subtracting an input voltage supplied to an inverting input terminal from an input voltage supplied to a non-inverting input terminal. Each of the differential voltage amplifiers 32a–32c outputs the predetermined minimum output voltage when the differential voltage is equal to or smaller than 0 volt. The minimum output voltage is sufficient to turn off the NMOS transistors 6a–6c of the charge current control circuits 4a–4c.

The differential voltage amplifiers 32a–32c are activated with a high-level output signal supplied from the charge detection circuit 21. Each of the differential voltage amplifiers 32a–32c is a differential amplification type amplifier and includes a transistor (a constant current source) that is turned on and off with the output signal of the charge detection circuit 21. When the output signal of the charge detection circuit 21 is at the high level in charging, the transistor is turned on and each of the differential voltage amplifiers 32a–32c is activated. When the output of the charge detection circuit 21 is at the low level in discharging, the transistor is turned off and each of the differential voltage amplifiers 32a–32c is deactivated. Therefore, at discharging, each of the differential voltage amplifiers 32a–32c does not consume power.

The non-inverting input terminal of the first differential voltage amplifier 32a is connected to the output terminal of the first cell voltage amplifier 8a of the cell voltage detection circuit 8. The inverting input terminal of the first differential voltage amplifier 32a is connected to the output terminal of the first priority circuit 33a. The first priority circuit 33a is connected to the output terminal of the second cell voltage amplifier 8b and the output terminal of the third cell voltage amplifier 8c and supplies the smaller voltage of the inter-terminal voltages Vb, Vc of the lithium ion batteries 1b, 1c to the inverting input terminal of the first differential voltage amplifier 32a.

Therefore, the first differential voltage amplifier 32a amplifies the differential voltage between the output voltage of the first cell voltage amplifier 8a (inter-terminal voltage Va of the first lithium ion battery 1a) and the smaller voltage of the inter-terminal voltages Vb, Vc of the Elithium ion batteries 1b, 1c and outputs an amplification voltage that corresponds to the differential voltage.

The output voltage of the first differential voltage amplifier 32a is supplied to the gate terminal of the NMOS transistor 6a of the first charge current control circuit 4a. Therefore, the on resistance of the NMOS transistor 6a is changed in accordance with the output voltage (i.e., the output voltage according to the differential voltage) of the first differential voltage amplifier 32a. That is, as the output voltage of the first differential voltage amplifier 32a becomes great, the on resistance of the NMOS transistor 6a becomes small and the current that flows into the first charge current control circuit 4a (i.e., a resistor 5a and the NMOS transistor 6a) increases.

The non-inverting input terminal of the second differential voltage amplifier 32b is connected to the output terminal of the second priority circuit 8b of the cell voltage detection circuit 8. The inverting input terminal of the second voltage detection circuit 32b is connected to the output terminal of the second priority circuit 33b. The second priority circuit 33b is connected to the output terminal of the first cell voltage amplifier 8a and the output terminal of the third cell voltage amplifier 8c and supplies the smaller voltage of the inter-terminal voltages Va, Vc of the lithium ion batteries 1a, 1c to the inverting input terminal of the second differential voltage amplifier 32b.

Therefore, the second differential voltage amplifier 32b amplifies the differential voltage between the output voltage of the second cell voltage amplifier 8b (inter-terminal voltage Vb of the second lithium ion battery 1b) and the smaller voltage of either of the inter-terminal voltages Va, Vc of the lithium ion batteries 1a, 1c and outputs an amplification voltage.

The output voltage of the second differential voltage amplifier 32b is supplied to the gate terminal of the NMOS transistor 6b of the second charge current control circuit 4b. Therefore, the on resistance of the NMOS transistor 6b is changed in accordance with the output voltage (i.e., the output voltage according to the differential voltage) of the second differential voltage amplifier 32b. That is, as the output voltage of the second differential voltage amplifier 32b becomes great, the on resistance of the NMOS transistor 6b becomes small and the current that flows into the second charge current control circuit 4b (i.e., a resistor 5b and the NMOS transistor 6b) increases.

The non-inverting input terminal of the third differential voltage amplifier 32c is connected to the output terminal of the third cell voltage amplifier 8c. The inverting input terminal of the third differential voltage amplifier 32c is connected to the output terminal of the third priority circuit 33c. The third priority circuit 33c is connected to the output terminal of the first cell voltage amplifier 8a and the output terminal of the second cell voltage amplifier 8b and supplies the smaller voltage of the inter-terminal voltages Va, Vb of the lithium ion batteries 1a, 1b to the inverting input terminal of the third differential voltage amplifier 32c.

Therefore, the third differential voltage amplifier 32c amplifies the differential voltage between the output voltage of the third cell voltage amplifier 8c (inter-terminal voltage Vc of the third lithium ion battery 1c) and the smaller voltage of either of the inter-terminal voltages Va, Vb of the lithium ion batteries 1a, 1b and outputs an amplification voltage.

The output voltage of the third differential voltage amplifier 32c is supplied to the gate terminal of the NMOS transistor 6c of the third charge current control circuit 4c. Therefore, the on resistance of the NMOS transistor 6c is changed in accordance with the output voltage (i.e., output voltage according to the differential voltage) of the third differential voltage amplifier 32c. That is, as the output voltage of the third differential voltage amplifier 32c becomes great, the on resistance of the NMOS transistor 6c becomes small and the current that flows in the third charge current control circuit 4c (i.e., a resistor 5c and the NMOS transistor 6c) increases.

Next, the operation of the charge and discharge circuit 300 is described.

When a charger is connected to the input/output terminals t1, t2 and charging to the battery 1 is started, the charge detection circuit 21 outputs a high-level output signal and the balanced current control circuit 31 is activated.

When each of the inter-terminal voltages Va–Vc of the lithium ion batteries 1a–1c is 3.8 volts, for example, the differential voltage is 0 volt. Therefore, each of the differential voltage amplifiers 32a–32c outputs the minimum output voltage. The NMOS transistors 6a–6c are turned off and charging is evenly performed to the lithium ion batteries 1a–1c toward 4.2 volts.

Then, for example, the case where the inter-terminal voltage Va of the first lithium ion battery 1a is 3.8 volts, the inter-terminal voltage Vb of the second lithium ion battery 1b is 3.6 volts and the inter-terminal voltage Vc of the third lithium ion battery 1c is 3.5 volts is described. The first differential voltage amplifier 32a receives the differential voltage of 0.3 volt, the second differential voltage amplifier 32b receives the differential voltage of 0.1 volt and the third differential voltage amplifier 32c receives the differential voltage of minus 0.1 volt. The first differential voltage amplifier 32a outputs the maximum first output voltage, the second differential voltage amplifier 32b outputs a second output voltage smaller than the first output voltage and the third differential voltage amplifier 32c outputs the minimum output voltage. Thus, the first and second charge current control circuits 4a, 4b are conducted and the third charge current control circuit 4c is nonconducted. Further, the on resistance of the transistor 6a of the first charge current control circuit 4a is smaller than the on resistance of the transistor 6b of the second charge current control circuit 4b. Therefore, a lot of current flows into the first charge current control circuit 4a. That is, a charge current increases in descending order of the inter-terminal voltages Va–Vc of the lithium ion batteries 1a–1c. As a result, the inter-terminal voltages Va–Vc of the lithium ion batteries 1a–1c gradually become equal.

When the inter-terminal voltages Va–Vc of the lithium ion batteries 1a–1c become equal each other, the NMOS transistors 6a–6c of the charge current control circuits 4a–4c are turned off and charging is evenly performed to the lithium ion batteries 1a–1c toward 4.2 volts.

The charge and discharge circuit 300 of the second embodiment has the following advantages:

In addition to the advantages (1) to (5) of the first embodiment, the balanced current control circuit 23 controls the charge current control circuits 4a–4c so that the charge current that corresponds to the potential difference of each of the lithium ion batteries 1a–1c flows into each of the lithium ion batteries 1a–1c. Therefore, the equalization time of the cell voltages Va–Vc of each of the lithium ion batteries 1a–1c is further shortened.

It should be apparent to those skilled in the art that the present invention may be embodied in many other specific forms without departing from the spirit or scope of the invention. Particularly, it should be understood that the invention may be embodied in the following forms.

The present invention may apply to not only a charge and discharge circuit of a notebook-size personal computer but also to the charge and discharge circuit of portable electronic apparatus, such as a digital camera, digital video, PDA (personal digital assistant) and cellular phone, for example.

The present invention may also apply to a charge and discharge circuit of a battery including two or four lithium ion batteries or more.

The present invention may also apply to a charge and discharge circuit of a secondary battery, such as a nickel hydrogen battery, other than a lithium ion battery.

If a charger installed in the personal computer or a charger that separately supplies a charge current to a battery pack can surely perform constant current and constant voltage control, the overcharge detection circuit 9 may be omitted.

The first reference offset voltage VD is not limited to 0.2 volt. For example, the cell voltages Va–Vc of the lithium ion batteries 1a–1c are equalized more strictly by setting the first reference offset voltage VD to a smaller voltage than 0.2 volt.

Therefore, the present examples and embodiments are to be considered as illustrative and not restrictive and the invention is not to be limited to the details given herein, but may be modified within the scope and equivalence of the appended claims.

What is claimed is:

1. A charge circuit for charging a plurality of secondary batteries, comprising:
    a plurality of charge current control circuits, connected in parallel to the plurality of secondary batteries, for performing bypass control of a charge current supplied to the plurality of secondary batteries; and
    a potential difference detection circuit, connected to the plurality of charge current control circuits, for detecting a voltage difference between the plurality of secondary batteries and for controlling the plurality of charge current control circuits in accordance with the voltage difference to selectively bypass the charge current supplied to the plurality of secondary batteries.

2. The charge circuit of claim 1, wherein the potential difference detection circuit controls the plurality of charge current control circuits such that the charge current is bypassed when the voltage difference is equal to or greater than a predetermined first reference voltage.

3. The charge circuit of claim 2, further comprising an overcharge detection circuit that detects voltages of the plurality of secondary batteries and stops charging into the plurality of secondary batteries when at least one of the detected voltages is equal to or greater than a predetermined second reference voltage.

4. A charge circuit for charging a plurality of secondary batteries, comprising:
    a plurality of charge current control circuits, connected in parallel to the plurality of secondary batteries and for performing bypass control of a charge current supplied to the plurality of secondary batteries;
    a plurality of potential difference detection circuits connected to the plurality of charge current control circuits, wherein each of the potential difference detection circuits detects a voltage difference between a voltage of the associated secondary battery and a voltage of another secondary battery and controls the associated charge current control circuit in accordance with the voltage difference to selectively bypass the charge current supplied to the associated secondary battery; and
    a charge detection circuit, connected to the plurality of potential difference detection circuits, for detecting whether charging is performed into the plurality of secondary batteries and for activating the plurality of potential difference detection circuits when the charging is performed.

5. The charge circuit of claim 4, wherein each of the potential difference detection circuits controls the associated charge current control circuit so that the charge current is bypassed when the voltage difference is equal to or greater than a predetermined first reference voltage.

6. The charge circuit of claim 5, further comprising an overcharge detection circuit that detects voltages of the plurality of secondary batteries and stops charging into the plurality of secondary batteries when at least one of the detected voltages is equal to or greater than a predetermined second reference voltage.

7. A charge and discharge circuit for charging and discharging of a plurality of secondary batteries, comprising:
    a plurality of charge current control circuits, connected in parallel to the plurality of secondary batteries for performing bypass control of a charge current supplied to the plurality of secondary batteries;
    a potential difference detection circuit, connected to the plurality of charge current control circuits for detecting a voltage difference of the plurality of secondary batteries and for controlling the plurality of charge current control circuits in accordance with the voltage difference to selectively bypass the charge current supplied to the plurality of secondary batteries;
    a charge detection circuit, connected to the potential detection circuit for detecting whether charging is performed into the plurality of secondary batteries and for activating the potential difference detection circuit when the charging is performed;
    an overcharge detection circuit for detecting voltage levels of the plurality of secondary batteries and stopping the charging into the plurality of secondary batteries when and at least one of the detected voltages is equal to or greater than a predetermined first reference voltage; and
    an over discharge detection circuit for detecting the voltage levels of the plurality of secondary batteries and for stopping discharging of the plurality of secondary batteries when at least one of the detected voltages drops to a voltage equal to or smaller than a predetermined second reference voltage.

8. A charge and discharge circuit that performs the charging and discharging of a plurality of secondary batteries, comprising:
    a plurality of charge current control circuits, connected in parallel to the plurality of secondary batteries, respectively, for performing bypass control of a charge current supplied to the plurality of secondary batteries;
    a plurality of potential detection circuits connected to the plurality of charge current control circuits, respectively, each potential detection circuit detecting a voltage difference between the voltage of associated secondary battery and the voltage of another secondary battery and controlling the associated charge current control circuit in accordance with the voltage difference to selectively bypass the charge current supplied to the associated secondary battery;

a charge detection circuit, connected to the plurality of potential difference detection circuit, for detecting whether charging is performed into the plurality of secondary batteries and activating the plurality of potential difference detection circuits;

an overcharge detection circuit for detecting the voltages of the plurality of secondary batteries and stopping the discharging of the plurality of secondary batteries when at least one of the detected voltages is equal to or greater than a predetermined first reference voltage; and an over discharge detection circuit for detecting the voltages of the plurality of secondary batteries and stopping the discharging of the plurality of secondary batteries when and at least one of the detected voltages drops to a voltage equal to or smaller than a predetermined second reference voltage.

9. The charging and discharging of claim 8, wherein each of the potential difference detection circuits controls the associated charge current control circuit so that the charge current is bypassed when the voltage difference is equal to or greater than a predetermined third reference voltage.

10. The charge and discharge circuit of claim 8, wherein each of the potential difference detection circuits controls the charge current that is bypassed by the associated charge current control circuit in accordance with the voltage difference.

11. The charge and discharge circuit of claim 8, further comprising:

a charge control switch that is on/off controlled by the overcharge detection circuit;

a discharge control switch that is on/off controlled by the over discharge detection circuit, wherein the charge control switch and the discharge control switch are connected in series with the plurality of secondary batteries; and a gate circuit, connected to the overcharge detection circuit and the over discharge detection circuit, for invalidating the stop of the discharging by the over discharge detection circuit and causing the discharge control switch to be turned on when charging is detected by the charge detection circuit.

12. A battery pack having a charge and discharge circuit that performs charging and discharging of a plurality of secondary batteries, the charge and discharge circuit comprising:

a plurality of charge current control circuits, connected to the plurality of secondary batteries, respectively, for performing bypass control of a charge current supplied to the plurality of secondary batteries;

a plurality of potential detection circuits connected to the plurality of charge current control circuits, each potential detection circuit detecting a voltage difference between the voltage of associated secondary battery and the voltage of another secondary battery and controlling the associated charge current control circuit in accordance with the voltage difference to selectively bypass the charge current supplied to the associated secondary battery;

a charge detection circuit, connected to the plurality of potential difference detection circuits, for detecting whether charging is performed into the plurality of secondary batteries and activating the plurality of potential difference detection circuits when the charging is performed;

an overcharging detection for detecting the voltages of the plurality of secondary batteries and stopping the discharging into the plurality of secondary batteries when at least one of the detected voltages is equal to or greater than a first reference voltage; and an over discharge detection circuit for detecting the voltages of the plurality of secondary batteries and stopping the discharging of the plurality of secondary batteries when and at least one of detected voltages drops to a voltage equal to or smaller than a predetermined second reference voltage.

13. A method for charging a plurality of secondary batteries including a first secondary battery, comprising the steps of:

detecting a voltage difference between the voltage of the first secondary battery and the voltage of another secondary battery; and selectively bypassing a charge current supplied to the first secondary battery in accordance with the detected voltage difference.

14. A method for charging a plurality of secondary batteries including first and secondary batteries, comprising the steps of:

detecting a first voltage difference between the voltage of the first secondary battery and the voltage of another secondary batteries including the secondary battery;

detecting a secondary voltage difference between the voltage of the second secondary battery and the voltage of another secondary batteries including the first secondary battery;

selectively bypassing charge current supplied to the first secondary battery in accordance with the first detected voltage difference; and selectively bypassing charge current supplied to the second secondary battery in accordance with the second detected voltage difference.

15. The method of claim 14, wherein the step of detecting the first voltage difference includes detecting the first voltage difference between the voltage of the first secondary batter and the lowest one of the voltages of the another secondary batteries including the second secondary battery, and the step of detecting the second voltage difference including detecting the second voltage difference between the voltage of the second secondary battery and the lowest one of the voltages of the another secondary batteries including the first secondary battery.

* * * * *